United States Patent
Jones

[19]

[11] Patent Number: 6,044,060

[45] Date of Patent: Mar. 28, 2000

[54] TRAFFIC SHAPING ATM NETWORK SWITCH

[75] Inventor: Trevor Jones, Maldon, United Kingdom

[73] Assignee: General DataComm, Middlebury, Conn.

[21] Appl. No.: 08/913,815

[22] PCT Filed: Apr. 22, 1996

[86] PCT No.: PCT/US96/05606

§ 371 Date: Sep. 15, 1997

§ 102(e) Date: Sep. 15, 1997

[87] PCT Pub. No.: WO96/34469

PCT Pub. Date: Oct. 31, 1996

[30] Foreign Application Priority Data

Apr. 22, 1995 [GB] United Kingdom ............... 9508225
May 10, 1995 [GB] United Kingdom ............... 9509483

[51] Int. Cl.[7] .......................................................... H04J 3/14
[52] U.S. Cl. .......................... 370/230; 370/395; 370/412
[58] Field of Search ................................. 370/230–236, 370/412, 395

[56] References Cited

U.S. PATENT DOCUMENTS 5,381,407  1/1995  Chao ..................................... 370/234
5,519,689  5/1996  Kim ...................................... 370/236
5,694,390 12/1997  Yamato et al. ....................... 370/236

*Primary Examiner*—Tesfaldet Bocure
*Assistant Examiner*—Maikhanh Tran
*Attorney, Agent, or Firm*—David P. Gordon; David S. Jacobson; Thomas A. Gallagher

[57] ABSTRACT

An ATM network switch includes a switch fabric (14), and a plurality of slot controllers (11) coupled to the switch fabric. Each slot controller has at least one external data link (12, 13), cell receiving circuitry (21) for receiving ATM cells from the data link and cell transmitting circuitry (22) for transmitting ATM cells outwardly on the data link. The cell transmitting circuitry of each slot controller includes traffic shaping circuitry (23) arranged to set, for each cell presented to the transmitting circuitry, a current onward transmission time where onward transmission at the input rate meets a predetermined flow rate criterion, and a delayed onward transmission time where onward transmission at the current time would cause the traffic on a VC to exceed a predetermined flow rate criterion. The traffic shaping circuitry includes a buffer (24) which stores each new cell at an address corresponding to the onward transmission time, and output logic (32 or 44) for outputting cells from the buffer at a time corresponding to the address thereof.

10 Claims, 3 Drawing Sheets

TRAFFIC SHAPING ATM NETWORK SWITCH

BACKGROUND OF THE INVENTION

1. Field of the Invention

This invention relates to an asynchronous transfer mode (ATM) network switch. More particularly, this invention relates to a switch having means for controlling the flow of ATM cells constituting an individual virtual connection (VC).

2. Background of the Invention

In ATM data transmission, cells of data conventionally comprising fifty-three bytes (forty-eight bytes carrying data and the remaining five bytes defining the cell header, the address and related information) pass through the network on a virtual connection at an agreed upon rate related to the available bandwidth and the level or service paid for. The agreed upon rate will relate not only to the steady average flow of data, but will also limit the peak flow rates.

Over an extensive network, cells on a connection can become bunched together with different cells having different delays imposed upon them at different stages, so that the cell flow on a VC then does not conform with the agreed upon rates. To prevent rates being exceeded to the detriment of other VC's in the network, the network will include, for example at the boundary between different networks, means for policing the flow. The flow policing means typically includes a "leaky bucket" device which assesses the peak and average flow rates of cells on a VC and if required either downgrades the cells' priority or discards cells. An example of such a device is disclosed in co-owned UK Patent Application No. 9505358.3 which is hereby incorporated herein in its entirety. Since policing can result in the discarding of cells which should not be discarded, it is desirable to effect "traffic shaping" to space out the cells on a VC sufficiently so as to ensure that they meet the agreed upon rates, and in particular the peak rates.

A problem with traffic shaping is that it is desirable to delay the transmission of cells by variable amounts in an attempt to avoid cell loss. In practice, however, variable cell delay has been difficult to implement.

SUMMARY OF THE INVENTION

It is therefore an object of the invention to provide a traffic shaping means for an ATM switch.

It is another object of the invention to provide an ATM switch with a traffic shaping mechanism which delays the transmission of incoming cells by varying amounts of time.

It is a further object of the invention to provide a traffic shaping mechanism for an ATM switch which accounts for both peak and average cell flow rates.

In accord with the objects of the invention, an ATM network switch is provided with a traffic shaping means on the input or output side thereof. The traffic shaping means broadly comprises means for determining for each cell received at the traffic shaping means an onward transmission time dependent upon the time interval between the arrival of the cell and the time of arrival of the preceding cell on the same VC, buffer means for storing each new cell at an address corresponding to the onward transmission time, and means for outputting cells from the buffer means at a time corresponding to the address thereof.

In one embodiment of the invention, the switch comprises a cross-point switch (switch fabric) having a plurality of input ports (cell receiving means for receiving ATM cells from a data link) and a plurality of output ports (cell transmitting means for transmitting ATM cells outwardly on the data link), and one or more controllers (which are often called "slot controllers" or "link controllers") for switching data cells from any input port to any output port. The cell transmitting means of each controller includes the traffic shaping means arranged to set, for each cell presented to the transmitting means, a current onward transmission time when onward transmission at the input rate meets a predetermined flow rate criterion, and a delayed onward transmission time when onward transmission at the current time would cause the traffic on a VC to exceed a predetermined flow rate criterion. The traffic shaping means comprises at least one leaky bucket processor for determining an onward transmission time, buffer means for storing each new cell at an address corresponding to the onward transmission time, and means for outputting cells from the buffer means at a time corresponding to the address thereof.

In a preferred embodiment, each leaky bucket processor of the traffic shaping means comprises:

a timer means for timing the arrival of each ATM cell presented to the transmitting means;

memory means for storing a predetermined regular bucket increment, a current bucket level value and a bucket maximum value, being the maximum capacity of the bucket;

calculating means for calculating the time difference between the arrival time of the cell and a stored onward transmission time for the preceding cell on the same VC, and for calculating a new bucket level from the time difference, the current bucket level, and the bucket increment;

subtraction means for subtracting the maximum level from the new level to give an overflow value and, if the overflow value is negative, for setting the value of the overflow to zero; and means for adding the overflow value to the current time to give the onward transmission time for the cell and for storing the onward transmission time in the memory or buffer means.

According to a preferred arrangement, the traffic shaping means comprises a leaky bucket processor which carries on two leaky bucket calculations, and means for comparing the overflow values calculated in the two leaky bucket calculations and for passing only the greater of the two values to the adding means. Preferably, a first of the two leaky bucket calculations monitors peak cell flow rates, while the second leaky bucket calculation monitors average cell flow rates.

According to another preferred aspect of the invention, the buffer means comprises a FIFO for each VC for storing cells on that VC, and memory means for storing at an address corresponding to the onward transmission time for each cell the address of the cell. The buffer means is suitably configured dynamically in Random Access Memory (RAM), so that the VC FIFOs are set up as new VCs are set up. Also, the output means is preferably arranged to output cells from the FIFOs in accordance with the data stored in the memory means.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
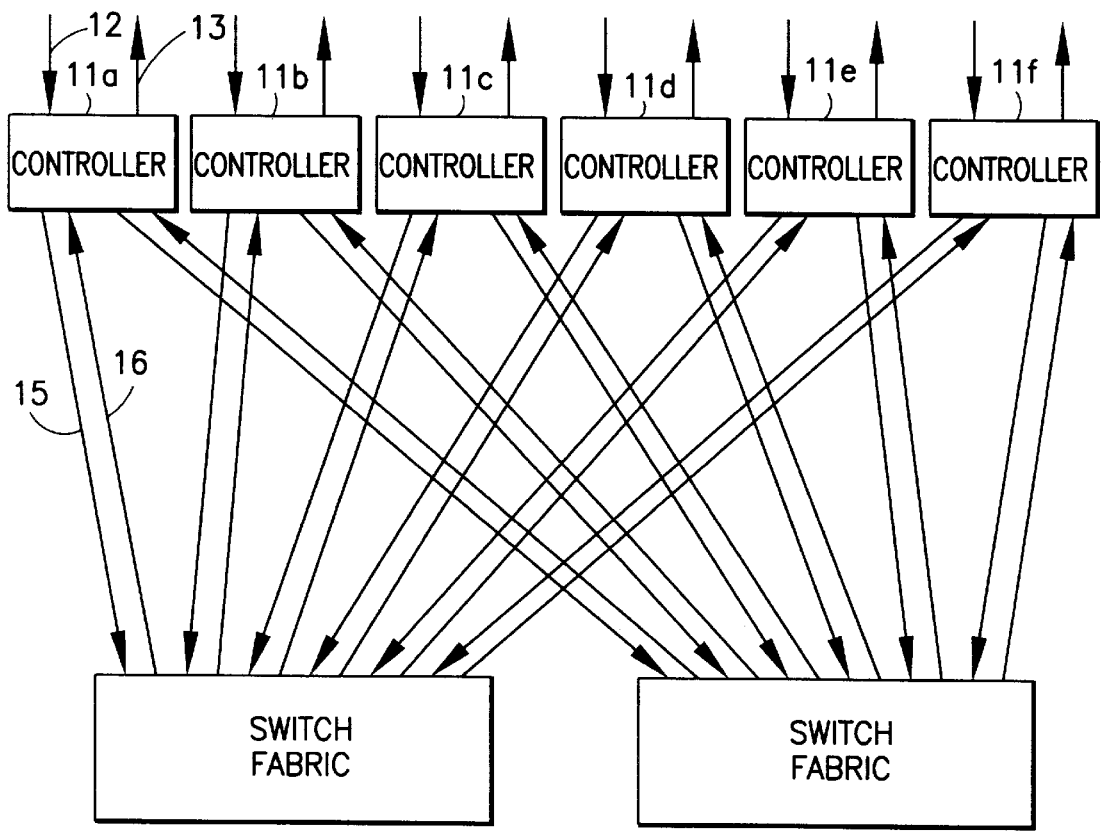
FIG. 1 is a representation of an ATM switch in accordance with the invention.

Referring to FIG. 1, an ATM network switch is shown comprising a plurality of slot controllers 11a–11f and two separate switch fabrics 14a and 14b. In the simple arrangement illustrated, six slot controllers are shown, but a typical switch might have sixteen slot controllers. Each slot controller 11 has an external input link 12 and output link 13. The switch fabrics 14a and 14b are of a dynamic crosspoint type with input and output connections 15 and 16 respectively to each of the slot controllers 11. This type of arrangement is described in more detail in co-owned application #GB9507454.8 which is hereby incorporated by reference herein in its entirety. The structure of the slot controllers is, for example, of the general type described and claimed in previously incorporated patent application #GB9505358.3, and ATM cells arriving on a input link 12 may be processed in the general manner described in that application.

Figure 2:
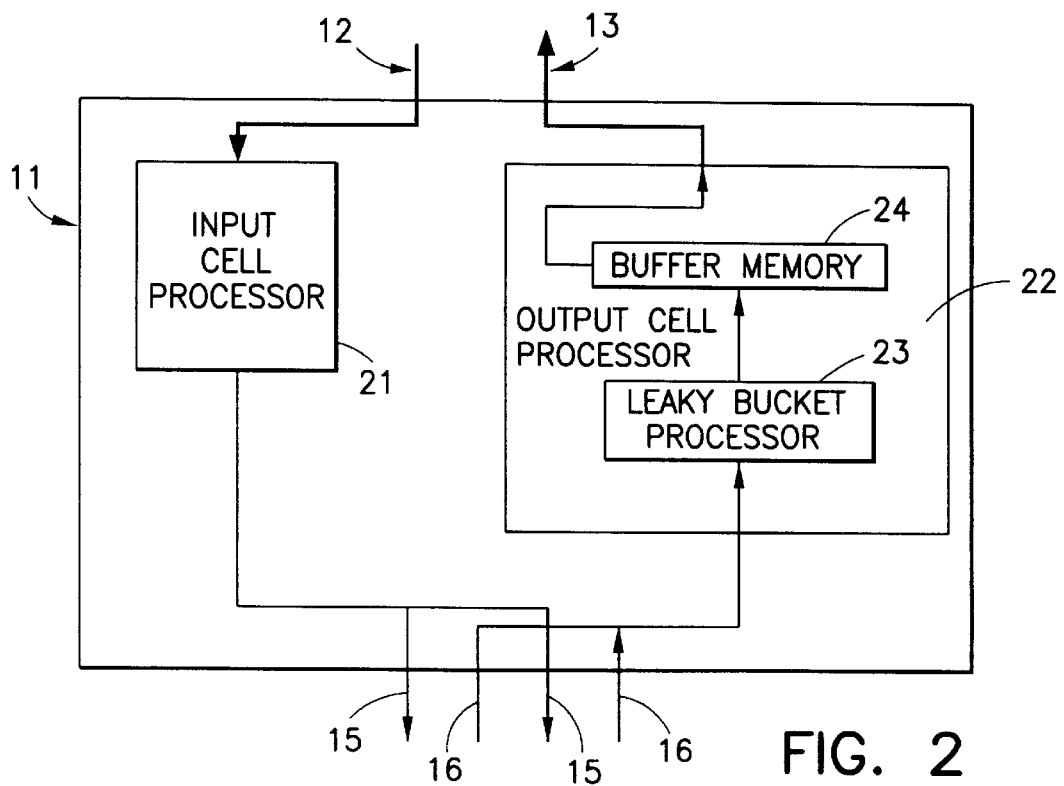
FIG. 2 is a more detailed representation of one of the slot controllers of the switch shown in FIG. 1.

FIG. 2 shows the structure of a slot controller 11 in more detail. In accord with the preferred embodiment of the invention, the slot controller 11 comprises an input cell processor 21, whose structure will not be described further since it has no bearing on the present invention. The input cell processor 21 is connected to the input link 12 and to the input connections 15 to the switch fabric. Cells output from the switch fabric on connections 16 are processed for the transmission on the output link 13 by an output cell processor 22 which includes a leaky bucket processing means 23 and a buffer memory 24. It is noted that in FIG. 2, for the sake of clarity, only those components which relate to traffic shaping functions are illustrated. It will be appreciated, however, that the output cell processor 22 handles additional functions such as the writing to the cell headers of the new VPI/VCI information, and output to the output link 13.

As previously mentioned, the output cell processor 22 comprises a leaky bucket processing means 23 and a buffer memory 24. The leaky bucket processing means 23 receives cells arriving from the switch fabric and determines for each cell, as hereinafter described with reference to FIG. 4, whether the peak and sustained cell flow rates appropriate to the cell's VC have been exceeded. If the cell conforms with the peak and sustained flow rates specified, the cell is entered into a buffer memory 24 at an address corresponding to the current time. If one or the other of the peak and sustained rates has been exceeded, so that the leaky bucket overflows, the amount of the overflow, or of the greater of the overflows if both buckets overflow, is added to the current time as the address for the cell in the buffer memory 24. Thus, the onward transmission of the cell is delayed by the amount of the overflow, to ensure that the cell will conform with the specified rates. The cells are output from the buffer memory 24 in order of stored time slot; i.e., the cells are not transmitted onwards before the relevant time slot becomes due.

Figure 3:
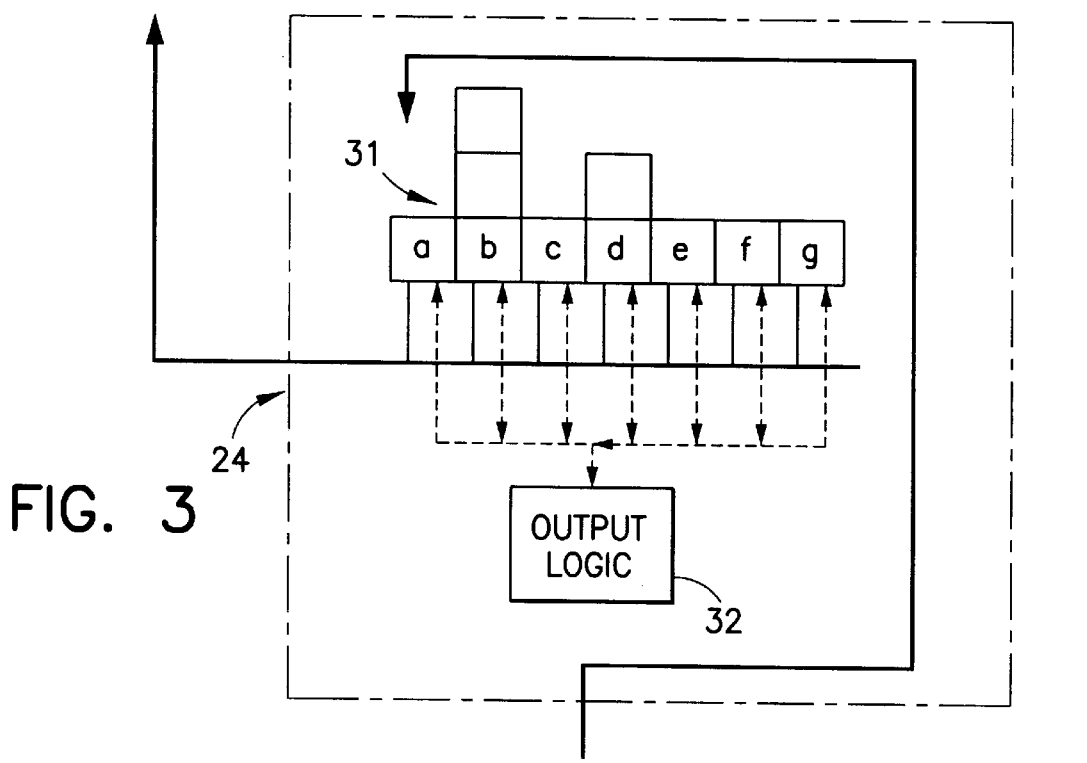
FIG. 3 is a representation of the buffer memory arrangement forming part of the traffic shaping means within the slot controller shown in FIG. 2.

FIG. 3 shows a first arrangement of the buffer memory 24 forming part of the traffic shaping means in the slot controller illustrated in FIG. 2. In the arrangement of FIG. 3, the buffer memory 24 comprises a multi-dimensional FIFO 31 dynamically configured in Random Access Memory (RAM). For convenience of illustration, only a very small portion of the buffer is shown in FIG. 3. The horizontal direction in the buffer represents different time slots arranged sequentially, the buffer being such that the current time pointer moves along the buffer until it reaches one end, and is then reset to the other end so that the buffer is effectively "circular". At each time slot, one or more ATM cells may be stored. The time slot may be empty if no cells are assigned the same onward transmission time. If more than one cell is assigned the same onward transmission time, the time slot is treated as a FIFO memory, with the cells being written to the slot sequentially and read out of the time slot in the same order in which they are written to the slot. An output logic means 32 is arranged to step a current time pointer along the buffer according to the actual current time, but to control output of cells according to an output time pointer which lags behind the current time by up to approximately eight time slots (the algorithm attempts to maintain a maximum of eight time slots lag, but if many cells are present a grater lag can sometimes develop). Conveniently, the time slots are each of 640 ns duration, being thirty-two clock periods of the system clock. In a convenient mode of operation, the output pointer waits until the current clock has advanced by eight slots relative to the output time, and then during the next time interval looks at each of the eight time slots to output the cells found. Thus, for the example shown in FIG. 3, the time slot b has three cells awaiting transmission, and these are transmitted in turn. The next slot, c might for example have no cells waiting, so the output time pointer jumps to the next slot d and causes the two cells waiting there to be transmitted in turn. If all the waiting cells in the eight slots have not been transmitted in the next time interval of 640 ns, the output time pointer continues to advance at eight-times the clock speed until it "catches up" and cells are being transmitted within the appropriate time interval. In practice, it is expected that the set of eight slots will allow the output to keep pace with the current time, but it will be appreciated that different numbers of slots, with appropriate speeds, may be selected if desired or if necessary.

Figure 4:
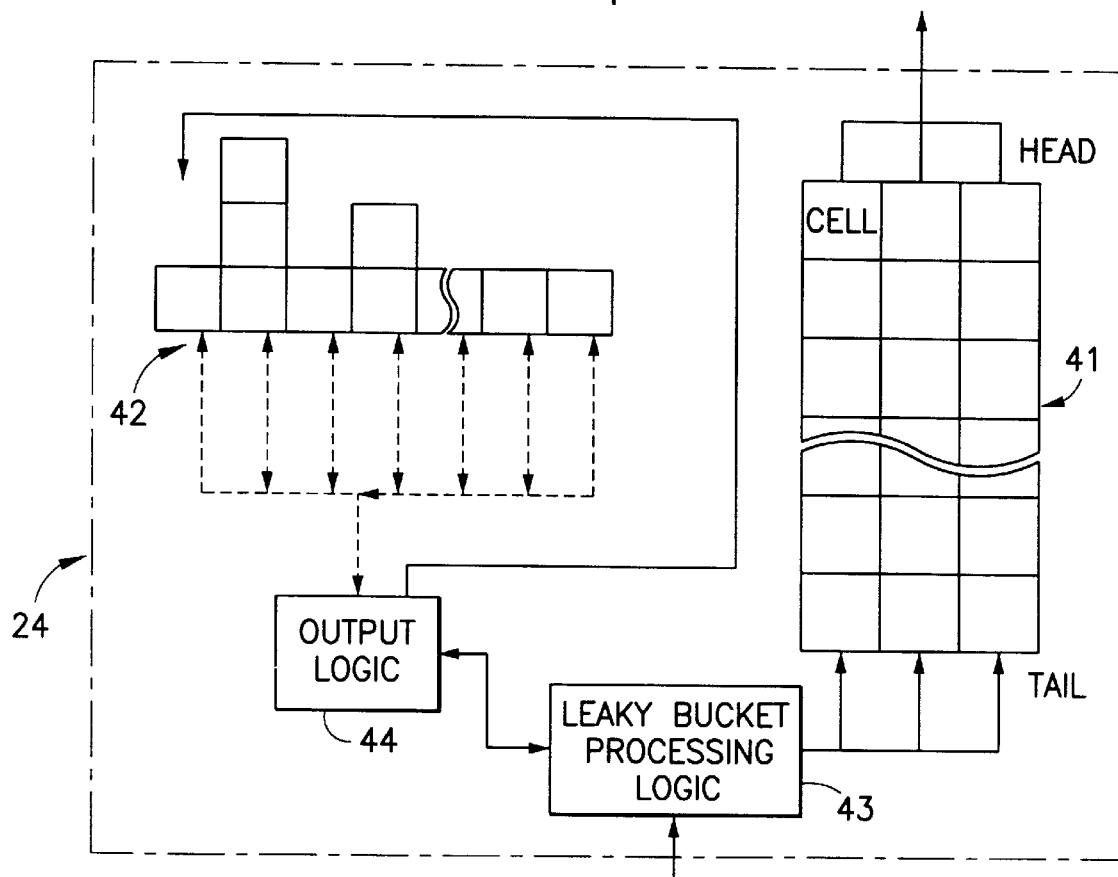
FIG. 4 is a representation of an alternative buffer arrangement which can be used with the traffic shaping means within the slot controller shown in FIG. 2.

FIG. 4 illustrates an alternative arrangement for the buffer part of the traffic shaping means, in which the cells are stored in a series of FIFOs 41 defined dynamically in RAM, each VC having its own FIFO, and a buffer memory 42 stores at appropriate time slot addresses the address of the relevant FIFO 41. Leaky bucket processing logic 43 is used to process incoming cells in the manner hereinbefore described with reference to FIG. 2, and as further described hereinafter with reference to FIG. 5. In a manner analogous to that described with reference to FIG. 3, the buffer memory 42 is controlled by logic 44 to store in sequential time slots the addresses of the cells in the FIFOs 41 instead of the actual cells, and to output the addresses in sequence to cause the cells to be output from the FIFOs 41. More than one address can be stored at any time slot, and the addresses are then output in sequence on a "first in first out" basis, in the same way as the actual cells are output in the embodiment described with reference to FIG. 3.

Figure 5:
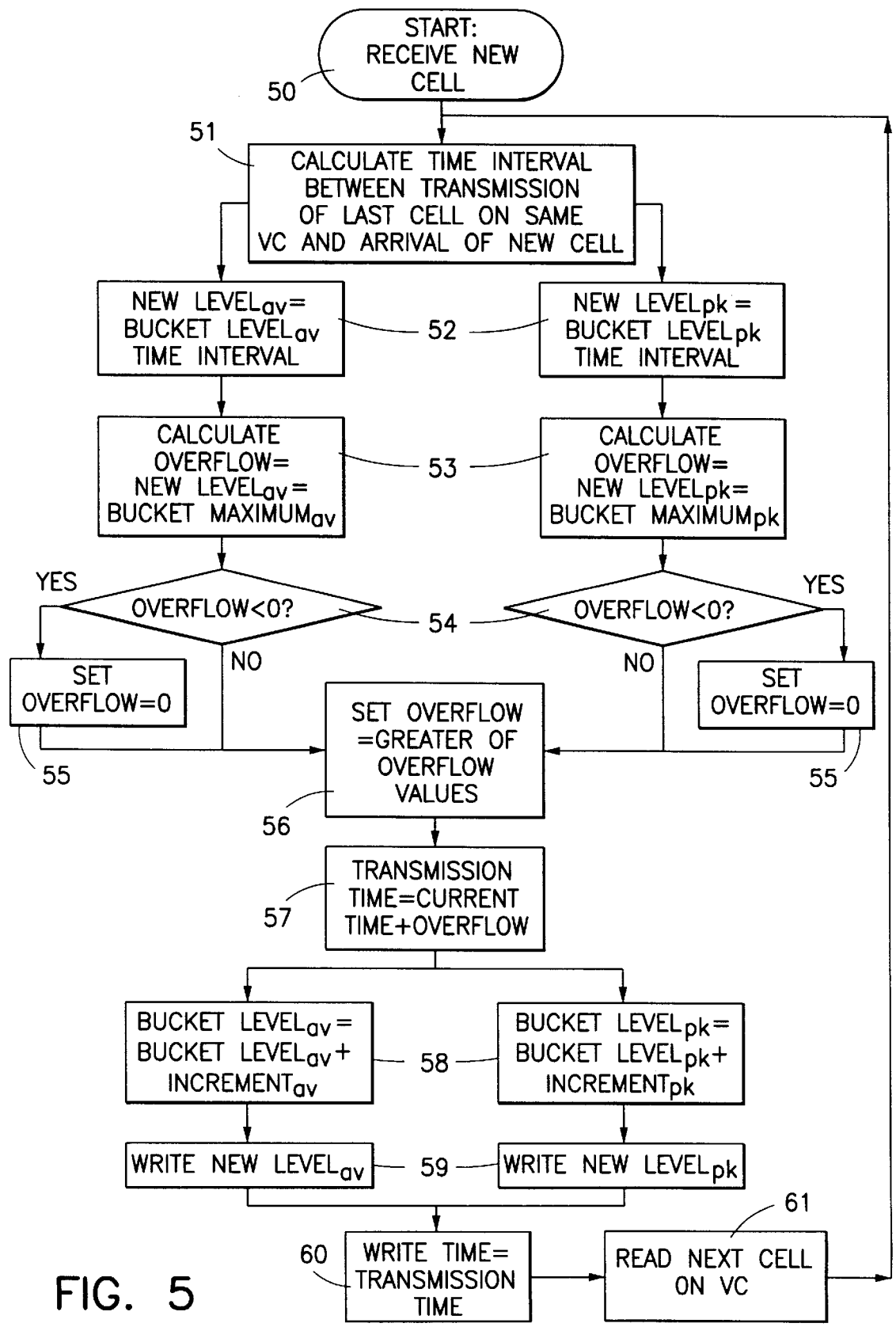
FIG. 5 is a flow diagram of the leaky bucket algorithm used in the traffic shaping means shown in FIG. 3.

FIG. 5 illustrates the algorithm used by the leaky bucket processor. The algorithm shown uses two buckets, one for peak flow and one for sustained flow, and each cell is process by both buckets, the result of the bucket having the greatest overflow being used to determine the time slot for the cell address (for the embodiment shown in FIG. 4) or (in the case of the system illustrated in FIG. 3) the time slot in the FIFO for the cell itself. The new cell is received at 50 to start the process. At 51, the algorithm calculates the time interval between the stored onward transmission time for the last cell on the same VC and the current time at which the new cell arrives. Then the new level of each bucket is determined at 52 by subtracting the calculated time interval from the existing bucket level, and the new level is used to calculate at 53 an overflow value by subtracting the bucket maximum from the new level. If it is determined at 54 that the overflow is negative, at 55 the overflow is set to zero. Regardless, the overflow values obtained from the two buckets (peak and average) are compared and the greatest overflow is selected at 56. At 57, the onward transmission time for the cell is set to the current time plus the amount of the overflow. Each bucket level is then incremented at 58 by the stored predetermined increment, which is equivalent to one cell, and the new bucket levels are written at 59 to the memory. The stored time is then set to the onward transmission time at 60 for use in the calculation for the next cell on the particular VC, and at 61 the system is ready to read the next cell on the VC.

The resulting transmission time from the performance of the algorithm is used to set the time slot in the buffer memory at which the cell (in the case of the embodiment is described with reference to FIG. 3), or the cell FIFO address (in the case of the embodiment described with reference to FIG. 4) is stored. The cell, or the address, then remains in the appropriate time slot until the output time pointer determines that its contents should be read and the cell output, either directly from the buffer, or, in the case of the FIG. 4 embodiment, from the separate FIFO 41. The result of this operation is that the cells are transmitted onward from the slot controller in a more controlled manner, with the effects of bunching of the cells having been removed.

There have been described and illustrated herein a traffic shaping ATM network switch. While particular embodiments of the invention have been described, it is noted intended that the invention be limited thereto, as it is intended that the invention be as broad in scope as the art will allow and that the specification be read likewise. Thus, while particularly preferred processor apparatus disclosed in co-owned applications was described, it will be appreciated that other processor apparatus could be utilized in accord with the principles of the invention. Likewise, while processing of two leaky buckets for peak and average flow rates was described, it will be appreciated that the leaky bucket processor could process any number of leaky buckets. It will therefore be appreciated by those skilled in the art that yet other modifications could be made to the provided invention without deviating from its spirit and scope as so claimed.

I claim:

1. An ATM switch, comprising:

traffic shaping means for regulating outgoing transmission of ATM cells from said ATM switch, said traffic shaping means comprising means for determining an onward transmission time for each ATM cell received at said traffic shaping means, said onward transmission time being dependent for each ATM cell upon a time interval between a first time of arrival of a particular ATM cell on a virtual connection (VC) and a second time of arrival of the ATM cell which preceded said particular ATM cell on said VC, buffer means for storing each said ATM cell received at an address corresponding to said onward transmission time determined for that ATM cell, and means for outputting from said buffer means each of said ATM cells at times corresponding to the addresses of said buffer means wherein said means for determining an onward transmission time comprises a leaky bucket processor having timer means for timing the arrival of each ATM cell presented to the said traffic shaping means, memory means for storing a predetermined regular bucket increment, a current bucket level value, a bucket maximum value, and an onward transmission time for the previous cell on a given VC, calculating means for calculating the time difference between the arrival time of the cell and the stored onward transmission time for the preceding cell on the same VC, and for calculating a new bucket level from the time difference, the current bucket level, and the bucket level increment, subtraction means for subtracting the maximum level from the new level to give an overflow value and, if the overflow value is negative, for setting the value of the overflow to zero, and adding means for adding the overflow value to the current time to give the onward transmission time for the cell and for storing said time in the memory means.

2. An ATM switch according to claim 1, wherein:

said leaky bucket processor monitors for a VC both a peak cell flow rate and an average cell flow rate, and said leaky bucket processor includes means for comparing overflow values calculated for said peak cell flow rate and said average cell flow rate by said subtraction means, and for passing only the greater of said overflow values to said adding means.

3. An ATM switch according to claim 1, wherein:

said buffer means comprises a FIFO for each VC for storing ATM cells on that VC, and memory means for storing at an address corresponding to the onward transmission time for each cell the address FIFO containing the cell, and the output means is arranged to output cells from the FIFOs in accordance with the data stored in the memory means.

4. An ATM switch according to claim 3, wherein:

said buffer means is configured dynamically in Random Access Memory (RAM), whereby the VC FIFOs are set up as new VCs are set up.

5. An ATM network switch, comprising:

a) a plurality of controllers, each controller having cell receiving means for receiving ATM cells from a data link and cell transmitting means for transmitting ATM cells outwardly on said data link;

b) a switch fabric means coupled to said plurality of controllers, said switch fabric means for switching a cell received from one of said plurality controller to a selected one of the other of said plurality of controllers for transmission on the external data link connected thereto, wherein each cell transmitting means of each slot controller includes traffic shaping means arranged to set, for each cell presented to the cell transmitting means, a current onward transmission time where onward transmission at the input rate meets a predetermined flow rate criterion, and a delayed onward transmission time where onward transmission at the current time would cause the traffic on a VC to exceed a predetermined flow rate criterion, said traffic shaping means comprising buffer means for storing each new cell at an address corresponding to the onward transmission time for a particular cell, and means for outputting cells from the buffer means at a time corresponding to the address thereof, wherein said traffic sharing means comprises a leaky bucket processor having timer means for timing the arrival of each ATM cell presented to the said traffic shaping means, memory means for storing a predetermined regular bucket increment, a current bucket level value, a bucket maximum value, and an onward transmission time for the previous cell on a given VC, calculating means for calculating the time difference between the arrival time of the cell and the stored onward transmission time for the preceding cell on the same VC, and for calculating a new bucket level from the time difference, the current bucket level, and the bucket level increment, subtraction means for subtracting the maximum level from the new level to give an overflow value and, if the overflow value is negative, for setting the value of the overflow to zero, and adding means for adding the overflow value to the current time to give the onward transmission time for the cell and for storing said time in the memory means.

6. An ATM switch according to claim 5, wherein:

said leaky bucket processor monitors for a VC both a peak cell flow rate and an average cell flow rate, and said leaky bucket processor includes means for comparing overflow values calculated for said peak cell flow rate and said average cell flow rate by said subtraction means, and for passing only the greater of said overflow values to said adding means.

7. An ATM switch according to claim 5, wherein:

said buffer means comprises a FIFO for each VC for storing ATM cells on that VC, and memory means for storing at an address corresponding to the onward transmission time for each cell the address FIFO containing the cell, and the output means is arranged to output cells from the FIFOs in accordance with the data stored in the memory means.

8. An ATM switch according to claim 7, wherein:

said buffer means is configured dynamically in Random Access Memory (RAM), whereby the VC FIFOs are set up as new VCs are set up.

9. An ATM switch, comprising:

a) a switch fabric means for switching ATM cells;

b) a plurality of input data links and output data links coupled to said switch fabric; and c) a plurality of traffic shaping means coupled to said switch fabric and to said output data links for regulating outgoing transmission of ATM cells from said ATM switch, each said traffic shaping means comprising i) means for determining an onward transmission time for each ATM cell received at said traffic shaping means, said onward transmission time being dependent for each ATM cell upon a time interval between a first time of arrival of a particular ATM cell on a virtual connection (VC) and a second time of arrival of the ATM cell which preceded said particular ATM cell on said VC, ii) buffer means for storing each said ATM cell received at an address corresponding to said onward transmission time determined for that ATM cell, and iii) means for outputting from said buffer means each of said ATM cells at times corresponding to the addresses of said buffer means wherein said means for determining an onward transmission time comprises a leaky bucket processor having timer means for timing the arrival of each ATM cell presented to the said traffic shading means, memory means for storing a predetermined regular bucket increment, a current bucket level value, a bucket maximum value, and an onward transmission time for the previous cell on a given VC, calculating means for calculating the time difference between the arrival time of the cell and the stored onward transmission time for the preceding cell on the same VC, and for calculating a new bucket level from the time difference, the current bucket level, and the bucket level increment, subtraction means for subtracting the maximum level from the new level to give an overflow value and, if the overflow value is negative, for setting the value of the overflow to zero, and adding means for adding the overflow value to the current time to give the onward transmission time for the cell and for storing said time in the memory means.

10. An ATM network switch according to claim 9, wherein:

said plurality of traffic shaping means are included within a plurality of controller means, each said controller means for controlling presentation of said ATM cells to said switch fabric means.

* * * * *